(12) United States Patent
Smith

(10) Patent No.: US 9,047,494 B1
(45) Date of Patent: Jun. 2, 2015

(54) SYSTEM AND METHOD FOR DISABLING AND/OR ENABLING A DEVICE

(75) Inventor: Arthur Quentin Smith, Fredericksburg, TX (US)

(73) Assignee: United Services Automobile Association, San Antonio, TX (US)

(*) Notice: Subject to any disclaimer, the term of this patent is extended or adjusted under 35 U.S.C. 154(b) by 1300 days.

(21) Appl. No.: 12/206,503

(22) Filed: Sep. 8, 2008

(51) Int. Cl.
| G06F 7/04 | (2006.01) |
| G06F 17/30 | (2006.01) |
| G06F 11/00 | (2006.01) |
| G06F 1/26 | (2006.01) |
| H04N 7/16 | (2011.01) |
| H04L 9/32 | (2006.01) |
| G06F 21/88 | (2013.01) |
| H04L 29/06 | (2006.01) |

(52) U.S. Cl.
CPC ............ *G06F 21/88* (2013.01); *H04L 63/0853* (2013.01)

(58) Field of Classification Search
CPC .... G06F 21/88; H04L 63/0853; H04L 63/108
USPC ....... 726/27, 35; 701/2; 340/426.11; 713/168
See application file for complete search history.

(56) References Cited

U.S. PATENT DOCUMENTS

| 5,801,616 | A | * | 9/1998 | Ghazarian et al. ........ 340/426.36 |
| 6,009,355 | A | * | 12/1999 | Obradovich et al. ............. 701/1 |
| 6,412,207 | B1 | * | 7/2002 | Crye et al. ................... 42/70.06 |
| 6,498,970 | B2 | * | 12/2002 | Colmenarez et al. ........... 701/36 |
| 6,611,201 | B1 | * | 8/2003 | Bishop et al. ............ 340/426.21 |
| 6,664,888 | B1 | * | 12/2003 | Bishop ..................... 340/426.11 |
| 6,744,874 | B2 | * | 6/2004 | Wu ........................... 379/220.01 |
| 6,924,728 | B2 | * | 8/2005 | Wisnia et al. ................ 340/5.31 |
| 6,952,155 | B2 | * | 10/2005 | Himmelstein ............... 340/5.52 |
| 7,088,219 | B2 | * | 8/2006 | Dawson et al. .............. 340/5.72 |
| 7,140,036 | B2 | * | 11/2006 | Bhagavatula et al. ............ 726/2 |
| 7,257,374 | B1 | * | 8/2007 | Creigh .......................... 455/41.2 |
| 7,355,506 | B2 | * | 4/2008 | Chandley ..................... 340/5.31 |
| 7,358,849 | B1 | * | 4/2008 | Pesina ...................... 340/426.17 |
| 7,760,076 | B2 | * | 7/2010 | Boggess .................. 340/426.11 |
| 7,805,372 | B2 | * | 9/2010 | Weiss .............................. 705/51 |
| 7,809,651 | B2 | * | 10/2010 | Weiss .............................. 705/68 |
| 7,812,712 | B2 | * | 10/2010 | White et al. ............... 340/426.2 |
| 7,825,782 | B2 | * | 11/2010 | Hermann ...................... 340/431 |
| 2002/0067248 | A1 | * | 6/2002 | Howells ........................ 340/426 |
| 2002/0100300 | A1 | | 8/2002 | Reeb et al. |

(Continued)

OTHER PUBLICATIONS

Wagar, C. et al. "Evaluation of Auto-Kill Switch", Canadian Police Research Centre, Jun. 1995, 7 pages.

*Primary Examiner* — Saleh Najjar
*Assistant Examiner* — Feliciano Mejia
(74) *Attorney, Agent, or Firm* — Baker & Hostetler LLP

(57) ABSTRACT

Operation of a device may be enabled or disabled by an instruction that may be given in a variety of ways. For example, a device (e.g., a car) may be equipped with a mechanism that disables ("kills") and/or enables ("unkills") some or all of the functionality of the car upon receipt of an appropriate instruction. The instruction could be given remotely. For example, the instruction could be given remotely from a wireless telephone by sending appropriate messages through a network. An instruction to re-enable operation of the device could also be given remotely. The honoring of kill and/or unkill instructions could be predicated on some type of authentication, such as the identity of the device from which the instruction is issued, a password, a biometric identification, the location from which the instruction is issued, or some other factor.

19 Claims, 5 Drawing Sheets

(56) References Cited

U.S. PATENT DOCUMENTS

| | | | |
|---|---|---|---|
| 2002/0152010 A1* | 10/2002 | Colmenarez et al. | 701/36 |
| 2002/0172345 A1* | 11/2002 | Wu | 379/220.01 |
| 2003/0222755 A1* | 12/2003 | Kemper et al. | 340/5.61 |
| 2004/0176978 A1* | 9/2004 | Simon et al. | 705/1 |
| 2005/0203674 A1* | 9/2005 | Obradovich et al. | 701/1 |
| 2005/0273213 A1 | 12/2005 | Little | |
| 2005/0275505 A1* | 12/2005 | Himmelstein | 340/5.8 |
| 2006/0059109 A1* | 3/2006 | Grimes | 705/72 |
| 2007/0185626 A1 | 8/2007 | Kaneko | |
| 2007/0185728 A1* | 8/2007 | Schwarz et al. | 705/1 |
| 2007/0194881 A1* | 8/2007 | Schwarz et al. | 340/5.31 |
| 2007/0198436 A1* | 8/2007 | Weiss | 705/75 |
| 2007/0224938 A1 | 9/2007 | Jung et al. | |
| 2007/0254538 A1 | 11/2007 | Viggiano et al. | |
| 2008/0148350 A1 | 6/2008 | Hawkins et al. | |
| 2008/0148376 A1 | 6/2008 | Onozawa et al. | |
| 2008/0221743 A1* | 9/2008 | Schwarz et al. | 701/2 |
| 2009/0075600 A1* | 3/2009 | Sanders et al. | 455/68 |
| 2009/0128308 A1* | 5/2009 | Chen | 340/425.5 |
| 2009/0212905 A1* | 8/2009 | Batz et al. | 340/5.54 |
| 2009/0265059 A1* | 10/2009 | Medwin et al. | 701/33 |
| 2009/0271762 A1* | 10/2009 | Taylor et al. | 717/107 |
| 2010/0035588 A1* | 2/2010 | Adler et al. | 455/414.1 |
| 2010/0045232 A1* | 2/2010 | Chen et al. | 320/109 |
| 2010/0293374 A1* | 11/2010 | Bushby | 713/168 |

* cited by examiner

SYSTEM AND METHOD FOR DISABLING AND/OR ENABLING A DEVICE

CROSS-REFERENCE TO RELATED CASES

This application is related by subject matter to the following commonly assigned applications, the entirety of which are hereby incorporated by reference herein: U.S. patent application Ser. No. 12/206,481, and U.S. patent application Ser. No. 12/206,495, each filed on Sep. 8, 2008, and each entitled "System and Method for Disabling and/or Enabling a Device".

BACKGROUND

Many machines, such as cars, are equipped with a form of "kill switch." The kill switch allows some or all of the functionality of the machine to be disabled. For example, a car may have a hidden switch (e.g., under the dashboard, in the glove compartment, etc.), that disables the car by shutting off the fuel supply, the ignition, or some other aspect of the car's operation. Kill switches may be used to disable a variety of machines. A car is an example of a machine that could have a kill switch, although other machines could also have such switches.

There are a small number of places where kill switches may be hidden, so most thieves know where to look for them. Moreover, the switch may be turned on or off, so once a thief finds the switch, he or she may turn the switch on and re-enable the car (or other type of machine that the kill switch is used for). Additionally, the fact that the switch is typically located on the machine to be disabled means that activating the kill switch involves being in physical proximity to the machine, so it is difficult for the owner to enable or disable the machine unless the owner is physically in the same place as the machine.

SUMMARY

Instructions to disable and/or enable a device may be given in a variety of ways. The instructions may be given from a location that is remote to the device—possibly through a communication network. There may be various restrictions placed on the nature of the instructions in order to prevent the instructions from being given by unauthorized parties and/or in inappropriate circumstances.

In one example, a wireless communications device (e.g., a wireless telephone, a personal digital assistant (PDA), etc.), may be used as a remote kill switch. The owner of a device (e.g., the owner of a car) uses the wireless communication device to issue an instruction to disable ("kill") the device. The device to be "killed" may receive the instruction through the communication network. For the device to follow the instruction may involve various forms of authentication. For example, the device may determine whether to follow the kill instruction based on the identity (e.g., electronic serial number, etc.) of the wireless communication device from which the instruction was issued. Or, the device may attempt to authenticate the kill instruction based a password, biometric identification, the location from which the instruction is given, or on some other criteria.

An instruction to re-enable ("unkill") the device may also be given. In some examples, the unkill instruction may be given and/or authenticated in the same manner as the kill instruction. In other examples, there may be different restrictions on the kill and unkill instructions, so that the kill and unkill instructions (in such examples) would have to be given in different manners or with different types of authentication. For example, a car owner may be able to issue a kill instruction through his or her wireless telephone, but may arrange to have the car honor unkill instructions only when received from the owner's insurance company or car-alarm service company. Thus, for example, a car owner could leave his or her car at the airport for an extended trip and could issue the instruction to "kill" the car from his or her wireless telephone when he or she walks away from the car. Then, upon the owner's return, he or she could call the insurance company or other service company and request that the company issue an unkill instruction when the owner returns. The car might be instructed not to honor unkill instructions from any location other than the insurance company or service company. That way, if the owner's wireless telephone is stolen while he or she is away, the person who steals the telephone would not also be able to use the telephone to unkill, and steal, the car.

This summary is provided to introduce a selection of concepts in a simplified form that are further described in the detailed description section. This summary is not intended to identify key features or essential features of the claimed subject matter, nor is it intended to be used to limit the scope of the claimed subject matter.

DETAILED DESCRIPTION

Many types of machines (e.g., cars) are equipped with kill switches, which disable operation of some or all of the machine's functionality. Typically, the kill switch is located on the machine whose operation is to be disabled or enabled, and the switch may be turned on and off. Thus, the machine may be enabled or disabled by anyone who has access to the switch. Moreover, the machine typically may not be enabled or disabled remotely, since enabling or disabling the machine typically involves having access to a switch that is located on the machine. The subject matter described herein provides various arrangements that allow a machine to be enabled or disabled remotely. Moreover, the subject matter described herein provides for various conditions to be imposed on the giving and/or honoring of disable ("kill") instructions and enable ("unkill") instructions. Such conditions may prevent machines from being enabled and/or disabled by unauthorized entities and/or in inappropriate circumstances.

Figure 1:
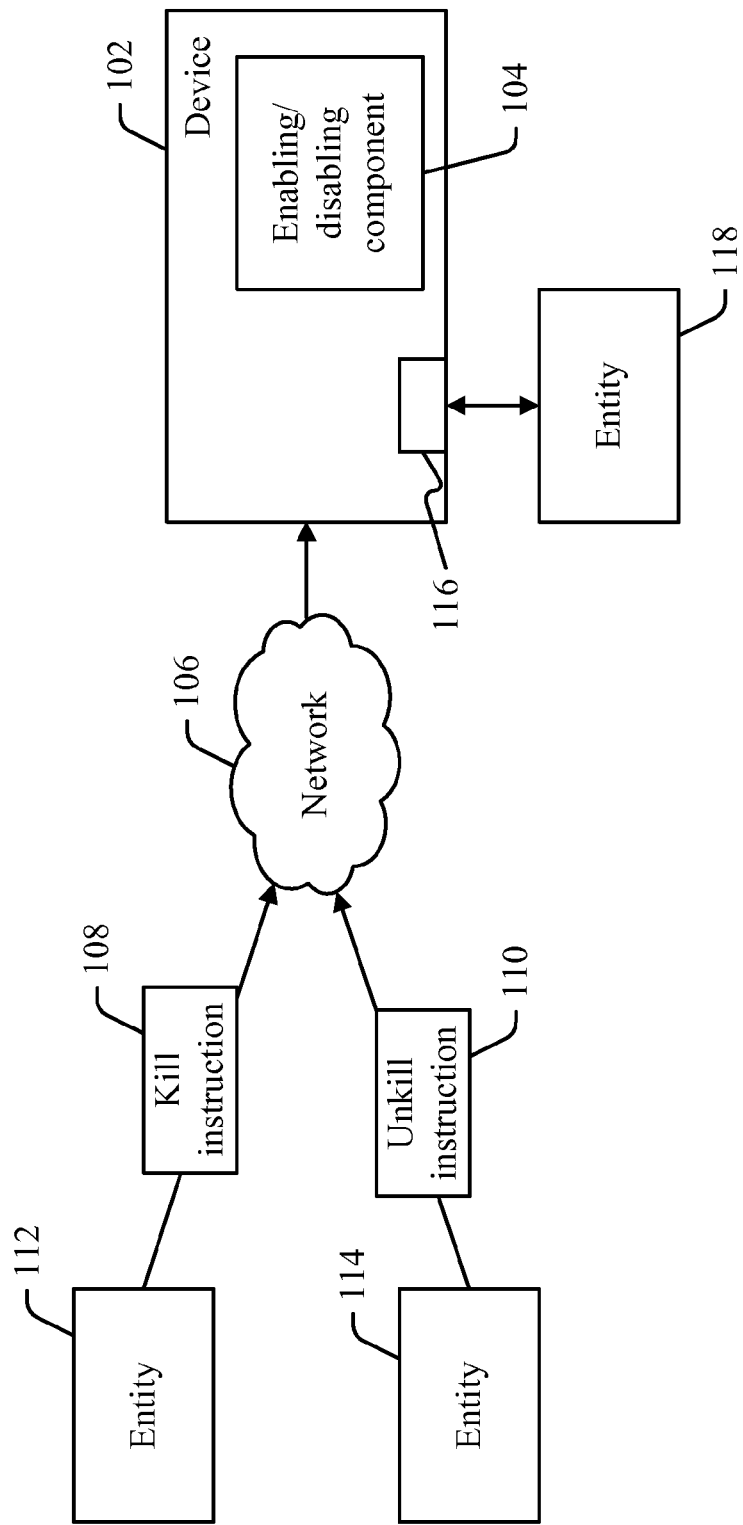
FIG. 1 is a block diagram of an example scenario in which a device may be enabled and/or disabled.
Figure 2:
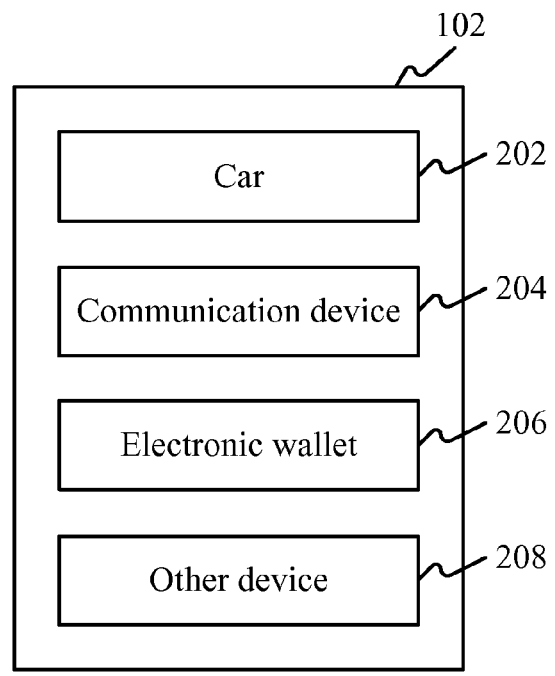
FIG. 2 is a block diagram of various examples of a device.

Turning now to the drawings, FIG. 1 shows an example scenario in which a device may be enabled and/or disabled. Device 102 is any type of apparatus, or part of an apparatus, that has the potential to operate in some manner. For example, device 102 could be a car, a computer, a home security system, a disk drive, a telephone, a life-support system, an electronic payment device, or any other type of apparatus. Some examples of device 102 are shown in FIG. 2, which is discussed subsequently, although the subject matter described herein is not limited to any particular type or form of device.

Device 102 may include, or otherwise make use of, an enabling/disabling component 104, which may be used to enable and/or disable the operation of some or all of device 102's functionality. The nature of enabling/disabling component 104, and the nature of the functionality to be enabled and/or disabled, may depend on the nature of device 102. For example, if device 102 is a car, then enabling/disabling component 104 may be a fuel cutoff or ignition cutoff that prevents the engine from starting or running. A car may have other functionality (e.g., sound system, interior and exterior lights, alarm system, etc.) that could be left operational even when the fuel or ignition cutoff has been activated. Similarly, if device 102 is a wireless telephone, enabling/disabling component 104 could shut off the radio on the telephone, while still allowing a clock, calculator, a game, etc., to work on the telephone. Thus, to say that enabling/disabling component 104 enables or disables functionality of device 102 does not necessarily mean that all functionality of the device is enabled or disabled. Enabling/disabling component 104 enables and/or disables at least some of the functionality of device 102. The amount of functionality that is enabled or disabled might be all of device 102's functionality, but, alternatively, could be less than all of device 102's functionality.

Device 102 may be connected to the world outside of device 102 through network 106. Network 106 could take any form. For example, if device 102 is a computer, network 106 could be, or could comprise, the Internet. If device 102 is a wireless telephone, then network 106 could comprise a cellular telephone network. (The cellular telephone network could also be connected to the Internet, so the cellular telephone network and the Internet could both be part of network 106.) Network 106 could also comprise wired and/or wireless local area networks, corporate (or other organizational) intranets, private networks, or any other type of network.

Device 102 may receive kill instruction 108 and/or unkill instruction 110 through network 106. Kill instruction 108 may cause enabling/disabling component 104 to disable some or all of the functionality of device 102. Unkill instruction 110 may cause enabling/disabling component 104 to enable (or re-enable) some or all of the functionality of device 102. For example, if device 102 is a car and enabling/disabling component 104 is a fuel or ignition cutoff for the car, then kill instruction 108 may cause enabling/disabling component 104 to cutoff the fuel or ignition to the car. Conversely, unkill instruction 110 may cause enabling/disabling component 104 to allow the fuel or ignition to operate normally. In some cases, the mechanism by which the disabling of device 102 occurs prevents an unkill instruction from being received through network 106. For example, if device 102 is a wireless telephone and enabling/disabling component 104 disables the telephone by disabling its radio, then unkill instruction 110 would not be received through a wireless network. In such a case, unkill instruction 110 might be given through other means, such as through a proximity component (discussed subsequently).

There may be various limitations on the manner in which kill instruction 108 and/or unkill instruction 110 may be given, and/or on which entity (or entities) may issue these instructions. In the example of FIG. 1, kill instruction 108 is given by entity 112, and unkill instruction 110 is given by entity 114. While FIG. 1 shows different entities giving kill instruction 108 and unkill instruction 110, these instructions could be given by the same entity, depending on the limitations that govern the issuance of such instructions. For example, if device 102 is a car, there may be a rule (implemented, for example, by computer software, hardware, or other logic) that allows the car owner to issue kill instruction 108, but calls for the unkill instruction to be issued by some other entity (e.g., a car-theft-prevention service company, the owner's insurance company, the owner's "roadside assistance" provider, or some other organization). For example, device 102 may allow the car's owner to issue kill instruction 108 through his or her wireless telephone, and may recognize an identifier (e.g., the electronic serial number, phone number, etc.) associated with that wireless telephone as a form of authentication. Since there is a possibility that the owner's telephone could be stolen, having a rule that the unkill instruction is to be issued in a manner different from the kill instruction prevents someone who steals the owner's telephone from also stealing the owner's car. (To say that the kill and unkill instructions are issued in "different manners" might mean, for example, that the instructions are issued by separate entities, with different forms of authentication, from different locations, etc.) For example, when the car owner leaves his or her car at the airport at the beginning of an extended trip, he or she could issue kill instruction 108 through his or her wireless telephone, and could then call the service company, insurance company, etc., to issue unkill instruction 110 when the owner returns. This method would prevent the car from being "unkilled" by a thief in the event that the owner loses his or her telephone while on vacation.

The foregoing example—in which entity 112 issues kill instruction 108 through his or her telephone, and in which entity 114 issues unkill instruction 110 in some other manner—is one example way to prevent the disabling of device 102 from being defeated by one who steals a telephone. However, there are numerous schemes possible, in which various combinations of entities, and various procedures, could be imposed as conditions for issuing kill instruction 108 and or unkill instruction 110. Some examples of the foregoing are described subsequently in connection with FIG. 4, although the subject matter described herein is not limited to any particular set of conditions on the issuing of kill and unkill instructions. Nor is the subject matter limited to the case in which the kill and/or unkill instructions are issued by any particular entity or combination of entities.

As previously noted, device 102 may have a proximity component 116, which allows kill and/or unkill instructions to be given from a position of proximity to device 102, without the use of network 106. Such a proximity component 116 may allow kill and/or unkill instructions to be given in the event that device 102's connectivity to network 106 becomes disabled (e.g., in the event that disabling of device 102 involved disabling device 102's radio or other communication link). Thus, an entity 118 that is in proximity to device 102 may issue a kill and/or unkill instruction through proximity component 116. In one example, proximity component could be a simple switch. In another example, proximity component 116 could involve some form of authentication mechanism—e.g., a keypad through which a passcode could be entered, a microphone through which a voice exemplar could be entered, a fingerprint scanner, an iris scanner, etc. Thus, issuing kill and/or unkill instructions through proximity component 116 could involve simply activating a switch, or could be predicated on some form of authentication.

FIG. 2 shows some examples of device 102. The examples shown in FIG. 2 are not exhaustive; device 102 could be any type of device and could take any form.

As previously noted, in one example device 102 could be car 202. In such a case, a kill instruction issued to car 202 could shut down some or all of the functionality of car 202—e.g., by shutting down the engine, the starter, the fuel pump, etc. Even if a kill instruction has been issued to car 202, it is possible that some portions of car 202 would continue to work—e.g., the radio, the alarm system, the lights, etc.

In another example, device 102 could be communications device 204. For example, communications device 204 could be a wireless telephone, a handheld computer, a network router, a fax machine, etc. Disabling a communications device may, for example, involve disabling the device's radio or other communication component. Thus, issuing a kill instruction to communications device 204 may leave some functionality in tact—e.g., a clock, a calendar, a game, etc., on a wireless telephone could continue to work, even if the communications capabilities of such a device have been disabled. In another example, some communications capabilities could be disabled while leaving others in tact—e.g., a wireless telephone could be disabled from making normal calls, while still permitting calls to an emergency service, such as 9-1-1. In yet another example, all of the functionality of communications device 204 could be disabled. However, it is noted that a kill instruction to communications device 204 could disable all, or less than all, of the functionality of communications device 204.

Another example of device 102 is electronic wallet 206. For example, a device may exist to perform some financial process. An example of performing such a financial process is to serve as a payment mechanism, by carrying a person's credit card numbers. Other examples of performing financial processes include performing transactions with debit card numbers, house account numbers, some form of "virtual cash", etc. If electronic wallet 206 is stolen, a kill instruction could be issued to electronic wallet 206 in order to prevent a thief from spending the wallet owner's money.

Device 102 could also be any other device 208. As previously noted, the devices shown in FIG. 2 and discussed herein are not exhaustive. However, some additional examples of devices could include: a computer, a health-care-related device, a cooking appliance, a power-generator, etc. As previously noted, the subject matter described herein applies to any type of device.

Figure 3:
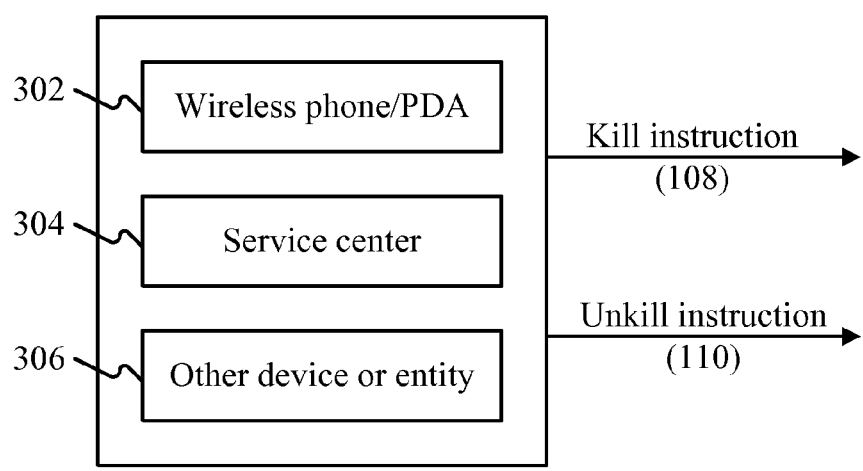
FIG. 3 is a block diagram of various example entities and/or mechanisms.

A kill or unkill instruction could be issued by a variety of different entities, using a variety of different mechanisms. FIG. 3 shows some examples of these entities and/or mechanisms. It is noted that the examples shown in FIG. 3 are not exhaustive, and the subject matter described herein applies to kill and/or unkill instructions issued by any entity (or entities) using any mechanism (or mechanisms).

In one example, a kill instruction 108 and/or an unkill instruction 110 may be given through a wireless phone/PDA 302. For example, a person could use his or her wireless telephone and/or Personal Digital Assistant (PDA) to issue a kill or unkill instruction by dialing a particular telephone number, sending a text message to an appropriate place, using a browser on the phone or PDA, using infrared communications from the phone or PDA, using Bluetooth connectivity, or using some form of near-field communication. Wireless telephones and PDAs are typically equipped with various types of communications capabilities, and any such communication capability could be used to issue a kill or unkill instruction. A wireless telephone or PDA typically carries an electronic serial number and/or is associated with a particular telephone number. Since either or both of these numbers may be sent along with communications originating from the telephone, the numbers received from the telephone may provide a form of authentication to help ensure that kill and/or unkill instructions are issued by a person with authorization to do so (on the assumption that the wireless telephone or PDA is in the possession of the authorized person). As one example, a person who is leaving for an extended trip could park his or her car at an airport and, after existing and locking the car, could use his or her wireless telephone or PDA to issue a kill instruction in order to prevent the car from being stolen.

In another example, a kill or unkill instruction could be issued from service center 304. As a security measure to prevent theft of the car in the preceding example, the wireless telephone or PDA that is used to issue the kill instruction might not be allowed to issue the unkill instruction. The owner of the car might, upon return from the trip, call a service center, which could use various authentication techniques (e.g., passcode, voice exemplar, etc.) to verify the caller's identity. Upon sufficient proof of identity, the service center could issue the unkill instruction. The car might be configured to reject an unkill instruction that does not come from the service center. Thus, if the owner's wireless telephone or PDA is stolen on the trip, the person who steals the telephone or PDA would be unable to use it to reactive the car.

The foregoing are some non-exhaustive examples of devices and/or entities that could be used to issue kill or unkill instructions. Other devices or entities (block 306) could also be used. It is also noted that a kill or unkill instruction does not have to be issued by the volitional act of a person or organization. For example, a car could have a mechanism that deactivates the car when the car leaves a particular geographic region (as detected by, e.g., a Global Positioning System device). Such a mechanism could prevent theft (e.g., use of the car could be restricted to some geographic region within which the car's owner normally drives), or could also be used to restrict young drivers from driving further from home than their parents permit.

Figure 4:
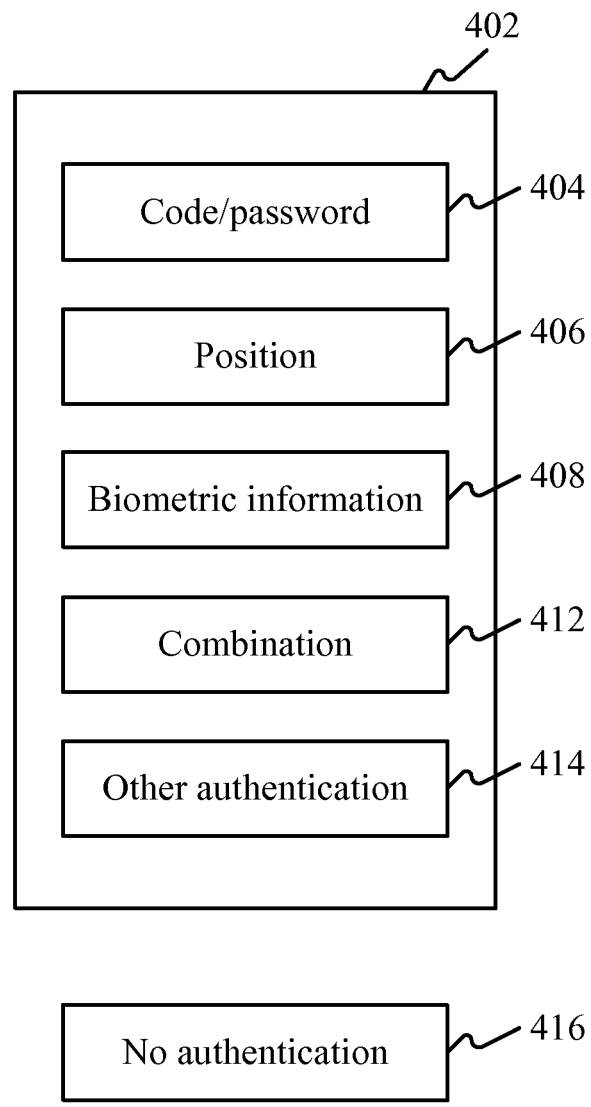
FIG. 4 is a block diagram of some examples of an authentication that may precede a device's acceptance of a kill and/or unkill instruction.

As previously mentioned, issuance of a kill or unkill instruction could be conditioned upon various types of authentication. There may be various implications to disabling a device and/or enabling a device, and thus authentication may ensure that a device is disabled and/or enabled under proper circumstances. Thus, in the previously described examples of a car parked at the airport, there may be reason to ensure, when a car has been disabled, that the car is being re-enabled by a particular service company. As another example, the device to be enabled and/or disabled could be a health care device on which a person depends for continued care and life-saving services. In such a case, there may be reason to ensure that the device is being disabled under appropriate circumstances—e.g., with the bilateral consent of two particular parties, whose identities and manifestations of assent have been appropriately confirmed. Thus, FIG. 4 shows some examples of an authentication 402 that may have to be satisfied before a device accepts a kill or unkill instruction.

In one example, authentication 402 comprises a code and/or password 404. In such an example, in order to issue a kill or unkill instruction, the entity that issues the instruction may enter a password or passcode. The kill or unkill instruction may be honored (or not) depending on whether the correct password or passcode is entered. In another example, authentication may be based on the position 406 of an entity that gives the kill or unkill instruction. For example, as previously mentioned, some instructions are given by a service center. The fact that the instruction is coming from the service center (as opposed to coming from some other place) may be detected by the device that receives the instruction. Thus, the position of the entity that gives the instruction may be used as a way to authenticate the instruction and to decide whether to honor the instruction. For example, the device could honor the instruction if the instruction comes from an approved location.

A further example of authentication is biometric information 408, such as a fingerprint scan, iris scan, etc. Thus, the ability to give a kill or unkill instruction may be predicated on presentation of correct biometric information, thereby binding the ability to give the instruction to a particular person. A further type of authentication is based on a combination 412. The combination could be a combination of particular entities (e.g., the ability to issue a valid kill or unkill instruction may be based on some pre-approved combination of two or more people acting in concert to give the instruction). Or, any forms of authentication could be combined—e.g., the ability to given an instruction could be predicated on a combination of a correct password, a correct position, and correct biometric information.

In addition to the foregoing examples, any other form of authentication could be used (block 414). As an alternative to the various types of authentication 402, it is also possible that no authentication could be used (block 416)—e.g., a kill or unkill instruction could be given and honored without any authentication.

Figure 5:
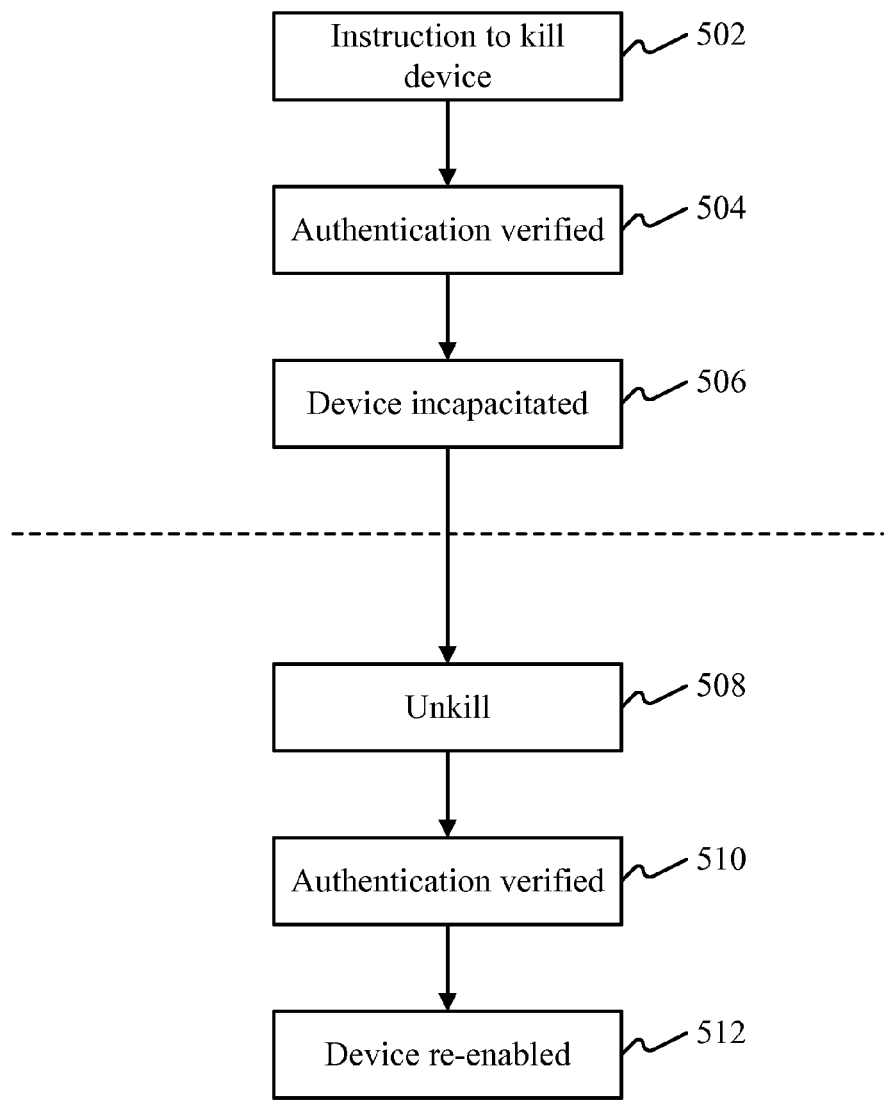
FIG. 5 is a flow diagram of various actions that may be taken with regard to disabling and/or enabling a device.

FIG. 5 shows, in the form of a flowchart, various actions that may be taken with regard to disabling and/or enabling a device.

At 502, an instruction to kill a device may be issued and/or received. At 504, an authentication associated with that instruction may be obtained and verified. At 506, the device that is the subject of the kill instruction may be wholly or partially incapacitated—e.g., operation of some or all of the functionality provided by that device may be disabled. The device could be incapacitated immediately, or there could be some delay imposed between the instruction and the actual incapacitation. For example, in the event that a car is to be incapacitated while it is moving, the driver could be given an audio or visual warning that incapacitation is about to take place, so that he or she could pull over to the side of the road.

Following incapacitation of the device, some period of time may pass during which the device is incapacitated. This period of time is indicated by the dotted line in FIG. 5. At some point subsequent to the incapacitation of the device, an unkill instruction may be issued and/or received (at 508). At 510, authentication (if any) associated with the unkill instruction may be verified. Based on the instruction and its associated authentication (if any), operation of some or all of the device's functionality may be re-enabled (at 512).

Figure 6:
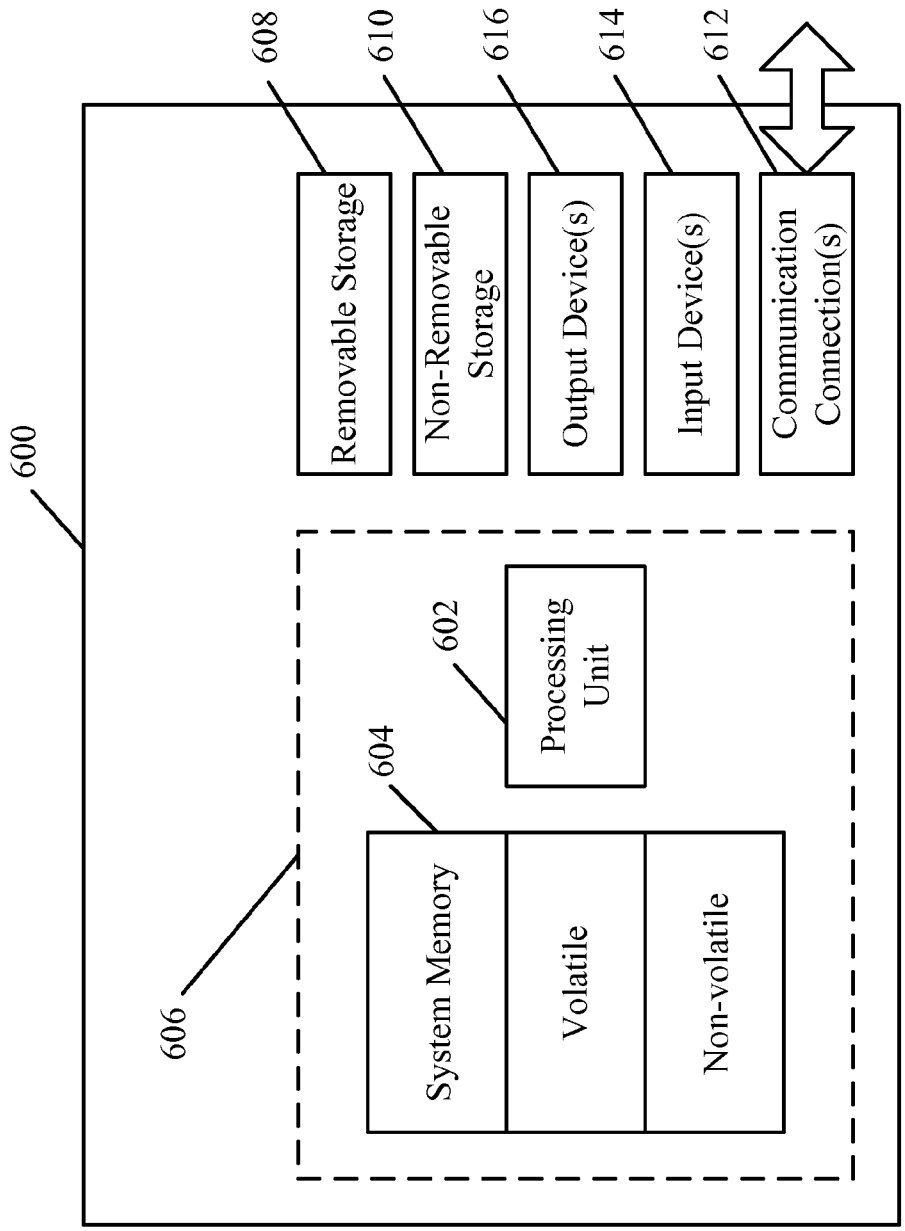
FIG. 6 is a block diagram of an example computing environment that may be used in connection with implementations of the subject matter described herein.

The subject matter described herein may be implemented through the use of a computer system, or other type of device that has some computing mechanism(s). FIG. 6 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an example system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media may be any available media that may be accessed by computing device 600 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 604, removable storage 608, and non-removable storage 610 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 600 may also have input device(s) 614 such as keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) may be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts previously described. Rather, the specific features and acts previously described are disclosed as example forms of implementing the claims.

The invention claimed is:

1. A system for preventing use of a device for a period of time, the system comprising:
  a memory and a processor;
  at least a first subsystem deployed in the memory and executed by the processor that receives, through a network in a first manner, a first instruction to disable a functionality of the device at a specified time;
  at least a second subsystem deployed in the memory and executed by the processor that disables the functionality based on the first instruction;
  at least a third subsystem deployed in the memory and executed by the processor that receives, after passage of the period of time, a second instruction to re-enable the functionality;
  at least a fourth subsystem deployed in the memory and executed by the processor that verifies that the second instruction is given by a combination of two or more entities, wherein the combination has been pre-approved to re-enable the functionality; and
  at least a fifth subsystem deployed in the memory and executed by the processor that re-enables the functionality based on verification of the second instruction by the fourth subsystem.

2. The system of claim 1, wherein the third subsystem receives a code with the second instruction, the system further comprising:
  at least a sixth subsystem deployed in the memory and executed by the processor that verifies the code, wherein the fifth subsystem re-enables the functionality based on verification of the code.

3. The system of claim 1, wherein the third subsystem receives biometric information with the second instruction, the system further comprising:
  at least a sixth subsystem deployed in the memory and executed by the processor that verifies the biometric information, wherein the fifth subsystem re-enables the functionality based on verification of the biometric information.

4. The system of claim 1, further comprising:
  at least a sixth subsystem deployed in the memory and executed by the processor that verifies a location from which the second instruction is given.

5. The system of claim 1, wherein the first manner comprises receipt of the first instruction from a wireless telephone through a cellular telephone network, and wherein the second instruction is given from a service center.

6. The system of claim 1, further comprising:
  at least a sixth subsystem deployed in the memory and executed by the processor that honors the first instruction without authentication; and
  at least a seventh subsystem deployed in the memory and executed by the processor that obtains authentication before honoring the second instruction.

7. A method of preventing use of a device for a period of time, the method comprising:
  receiving, through a network in a first manner, a first instruction to disable a functionality of the device at a specified time;
  disabling the functionality based on the first instruction;
  receiving, after passage of the period of time, a second instruction to re-enable the functionality;
  verifying that the second instruction is given by a combination of two or more entities, wherein the combination has been pre-approved to re-enable the functionality; and
  re-enabling by a computing device the functionality based on verification of the second instruction by the fourth subsystem.

8. The method of claim 7, wherein a code is received with the second instruction, the method further comprising:
  verifying the code, wherein re-enabling the functionality is further based on verification of the code.

9. The method of claim 7, wherein biometric information is received with the second instruction, the method further comprising:
  verifying the biometric information, wherein re-enabling the functionality is further based on verification of the code.

10. The method of claim 7, further comprising:
  verifying a location from which the second instruction is given.

11. The method of claim 7, wherein the first manner comprises receipt of the first instruction from a wireless telephone through a cellular telephone network, and wherein the second instruction is given from a service center.

12. The method of claim 7, further comprising:
honoring the first instruction without authentication; and
obtaining authentication before honoring the second instruction.

13. A non-transitory computer-readable medium comprising computer readable instructions for preventing use of a vehicle for a period of time, the computer readable instructions comprising instructions that:
detect that the vehicle is outside of a particular geographic region;
receive, through a network in a first manner, a first instruction to disable a functionality of the vehicle at a specified time;
disable the functionality based on the first instruction;
receive, after passage of the period of time, a second instruction to re-enable the functionality; and
verify that the second instruction is given by a combination of two or more entities, wherein the combination has been pre-approved to re-enable the functionality; and
re-enable the functionality based on verification of the second instruction.

14. The non-transitory computer-readable medium of claim 13, wherein a code is received with the second instruction, the medium further comprising instructions that:
verify the code, wherein re-enabling the functionality is further based on verification of the code.

15. The non-transitory computer-readable medium of claim 13, wherein biometric information is received with the second instruction, the medium further comprising instructions that:
verify, as a condition to re-enabling the functionality, biometric information associated with a giver of the second instruction the biometric information, wherein re-enabling the functionality is further based on verification of the code.

16. The non-transitory computer-readable medium of claim 13, further comprising instructions that verify a location from which the second instruction is given.

17. The non-transitory computer-readable medium of claim 13, further comprising instructions that:
verify, as a condition to re-enabling the functionality, that the second instruction is given by a combination of two or more entities, wherein the combination has been pre-approved to re-enable the functionality.

18. The non-transitory computer-readable medium of claim 13, wherein the first manner comprises receipt of the first instruction from a wireless telephone through a cellular telephone network, and wherein the second instruction is given from a service center.

19. The non-transitory computer-readable medium of claim 13, further comprising instructions that:
honors the first instruction without authentication; and
obtains authentication before honoring the second instruction.

* * * * *